United States Patent
Herman et al.

(10) Patent No.: US 10,640,280 B2
(45) Date of Patent: May 5, 2020

(54) TRIGGER ASSEMBLY AND METHOD OF OPERATION

(71) Applicant: MERITOOL LLC, Salamanca, NY (US)

(72) Inventors: Timm Randall Herman, Ellicottville, NY (US); Brent Michael Findlay, East Concord, NY (US); Mason S. James, Cuba, NY (US)

(73) Assignee: Meritool LLC, Salamanca, NY (US)

( * ) Notice: Subject to any disclaimer, the term of this patent is extended or adjusted under 35 U.S.C. 154(b) by 96 days.

(21) Appl. No.: 15/943,159

(22) Filed: Apr. 2, 2018

(65) Prior Publication Data

US 2018/0290165 A1  Oct. 11, 2018

Related U.S. Application Data

(60) Provisional application No. 62/482,002, filed on Apr. 5, 2017, provisional application No. 62/482,025, filed on Apr. 5, 2017, provisional application No. 62/481,967, filed on Apr. 5, 2017.

(51) Int. Cl.

| | |
|---|---|
| *B65D 83/00* | (2006.01) |
| *B05B 12/02* | (2006.01) |
| *B05B 12/00* | (2018.01) |
| *H02P 3/06* | (2006.01) |
| *B05C 17/01* | (2006.01) |
| *B05C 11/10* | (2006.01) |
| *B05C 17/005* | (2006.01) |

(52) U.S. Cl.
CPC ........ *B65D 83/0033* (2013.01); *B05B 12/002* (2013.01); *B05B 12/004* (2013.01); *B05B 12/02* (2013.01); *B05C 11/1002* (2013.01); *B05C 17/0103* (2013.01); *B05C 17/014* (2013.01); *B05C 17/0116* (2013.01); *H02P 3/06* (2013.01); *B05C 17/00553* (2013.01)

(58) Field of Classification Search
CPC ........ B05B 3/00; B05B 9/0866; B05B 9/0872
See application file for complete search history.

(56) References Cited

U.S. PATENT DOCUMENTS

| | | | |
|---|---|---|---|
| 6,644,507 | B2 * | 11/2003 | Borut ................... A61L 9/12 222/37 |
| 6,889,872 | B2 | 5/2005 | Herman et al. |
| 8,020,727 | B2 | 9/2011 | Herman et al. |
| (Continued) | | | |

FOREIGN PATENT DOCUMENTS

WO    WO 2017/161073 A1    9/2017

*Primary Examiner* — Bickey Dhakal
*Assistant Examiner* — Said Bouziane
(74) *Attorney, Agent, or Firm* — Tarolli, Sundheim, Covell & Tummino LLP; John A. Yirga, Esq.

(57) ABSTRACT

A trigger assembly can be used to activate a motor controller to cause a motorized device to respond in a certain manner. For example, when the motorized device is a power tool, based on a number of pulls of the trigger, the motor controller can run the power tool in a forward direction or a reverse direction. A power tool running in the forward direction can receive a tap of the trigger. A timer can be started upon detecting the pull of the trigger. Another tap of the trigger can be detected within a time period determined based on the timer. The power tool can be forced to perform a reverse operation when the other tap f the trigger is within the time period.

20 Claims, 6 Drawing Sheets

(56) References Cited

U.S. PATENT DOCUMENTS

| | | | |
|---|---|---|---|
| 8,057,413 B2 * | 11/2011 | Katsukawa | A61H 35/006 239/263.1 |
| 8,393,501 B2 | 3/2013 | Herman et al. | |
| 8,950,627 B2 | 2/2015 | Herman et al. | |
| 2005/0127862 A1 * | 6/2005 | Glasgow | B05C 17/00503 318/280 |
| 2006/0157260 A1 * | 7/2006 | Greese | B25B 21/00 173/1 |

* cited by examiner

TRIGGER ASSEMBLY AND METHOD OF OPERATION

CROSS-REFERENCE TO RELATED APPLICATIONS

The present application claims priority under 35 U.S.C. § 119(e) to U.S. Provisional Patent Application Ser. No. 62/481,967 filed Apr. 5, 2017 entitled MATERIAL DISPENSER STABILIZING ASSEMBLY, to U.S. Provisional Patent Application Ser. No. 62/482,025 filed Apr. 5, 2017 entitled MATERIAL DISPENSER CONTROL ASSEMBLY and to U.S. Provisional Patent Application Ser. No. 62/482,002 filed Apr. 5, 2017 entitled TRIGGER ASSEMBLY AND METHOD OF OPERATION. The entire contents of the above-identified applications from which priority is claimed are incorporated herein by reference in their entireties for all purposes.

FIELD OF THIS DISCLOSURE

The present disclosure relates to a trigger assembly of a motorized device. More specifically, the present disclosure relates to a motor controller that performs a method of operation to respond to a number of cycles of a switch thereby instructing a motor to perform one or more operations.

BACKGROUND

One example of a motorized device that uses a trigger assembly is a dispensing tool. Dispensing tools have been available for a number of years, assisting in the application of material to a desired surface in residential, commercial, or manufacturing environments. Such materials include, for example, adhesives, lubricants, and sealants such as, silicone, urethanes, and caulk. Conventional dispensing tools frequently visualized are of the type of a Handheld caulk gun, as illustrated in U.S. Pat. No. 8,950,627 that issued on Feb. 10, 2015 and is assigned to the assignee of the present disclosure (hereinafter "the '627 patent"). The '627 patent is incorporated herein by reference in its entirety for all purposes.

Cartridges having any number of different types of materials, including those listed above are inserted into a cartridge support sleeve located on the top side of the dispensing tool or handheld caulk gun. A manual trigger on the gun when actuated drives a rack having a plunger or piston that engages the material located in the cartridge such that each actuation of the trigger, forces material to be dispensed from a nozzle located at an end of the cartridge.

A more modern dispensing tool for applying various materials, including those materials listed above is a power dispensing gun as also described in detail and illustrated in the '627 patent. The power dispensing gun includes a battery, pneumatic, or other means for powering motor for portable use. The power dispensing gun is also capable of using the cartridges filled with dispensing material by inserting the cartridges into a support sleeve located on the top of the power dispensing gun. A trigger on the power dispensing gun is actuated, driving a rack having a plunger or piston that engages the material located in the cartridge such that each actuation of the trigger forces material to be dispensed from a nozzle located at an end of the gun.

Further details of the operation and configuration of a power dispensing gun are also explained for example, in U.S. Pat. No. 6,889,872 entitled ELECTRIC TWO PART MATERIAL DISPENSER that issued on May 10, 2005, U.S. Pat. No. 8,020,727 entitled POWER DISPENSING TOOL AND METHOD FOR CONTROLLING SAME that issued on Sep. 20, 2011, and International Patent Application Serial No. PCT/US2017/22634 entitled BATTERY POWERED DISPENSER FOR ONE AND TWO COMPONENT FOILS AND CARTRIDGES that was filed on Mar. 16, 2017 and published on Sep. 21, 2017 under international publication no. WO/2017/161073. The above-identified patents and publication are assigned to the assignee of the present application and incorporated herein by reference in their entireties for all purposes.

Cartridges are not the only form of container for holding material used by the dispensing guns, but another known type of container is a sausage pack or bag-type containers are also used. The sausage pack has a first and a second end spaced about a body having dispensing material therein. The sausage pack during use is positioned in a housing tube or barrel located on the guns in place of the cartridge support sleeves. The sausage pack once inserted into the guns has an opening typically formed from removal of a containment ring or by piercing the sausage pack toward the nozzle and the plunger squeezes the material out the nozzle when the trigger is engaged.

One example of a dispensing tool having interchanging support sleeves includes U.S. Pat. No. 8,393,501 entitled DISPENSING TOOL that issued on Mar. 12, 2013, is assigned to the assignee of the present disclosure, and is incorporated herein by reference in its entirety for all purposes. The '501 patent illustrates a system for interchanging support sleeves from a cartridge-type dispenser to a sausage pack dispenser and vice versa as desired by the operator on a single power dispenser.

Sausage packs are typically more economical because of their cheaper fabrication. As a result, the sausage packs are typically used more frequently in high volume commercial and manufacturing operations over conventional cartridges in material dispensing guns.

SUMMARY

One aspect of the present disclosure includes a method that can be implemented by a motor controller of a motorized device. The motorized device, such as a power tool, can be run in a forward direction. The power tool running in the forward direction can receive a tap of the trigger. A timer can be started upon detecting the pull of the trigger. Another tap of the trigger can be detected within a time period determined based on the timer. The time period can be within a predefined threshold. The power tool can be forced to perform a reverse operation when the other tap of the trigger is within the time period.

Another aspect of the present disclosure includes a material dispensing gun comprising a microprocessor coupled to a motor and a power supply. The microprocessor providing a switch for supplying power to the motor from the power supply when the switch is in a first state. The microprocessor further comprising a counter, a timer, and memory, the memory having prescribed normal run time threshold, prescribed minimum time threshold, and prescribed counter threshold. The timer being enabled to clock a run time measuring the duration as the switch changes from a second state to the first state, such that when the run time is greater than the minimum prescribed time threshold and less than the prescribed normal run time threshold, the counter is incremented by the microprocessor until the counter is equal to the prescribed counter threshold thereby enabling the microprocessor to provide a threshold signal to perform an operation.

While another aspect of the present disclosure includes a method of operating a dispensing tool, the method comprising the steps of: providing a housing for supporting a microprocessor coupled to a motor, power supply, piston, and gear train, the microprocessor providing a switch for supplying power to the motor when the switch is in a first state; the microprocessor further providing a counter, a timer, and memory; prescribing in the memory a normal run time threshold, a minimum time threshold, and a counter threshold; enabling the timer to clock a run time measuring the duration as the switch changes from a second state to the first state; evaluating the run time with the processor by comparing the run time to the prescribed normal run time threshold and prescribed minimum time threshold; and incrementing the counter by the microprocessor when the comparing the run time is found between the prescribed normal run time threshold and prescribed minimum time threshold until the counter is equal to the prescribed counter threshold thereby enabling the microprocessor to provide a threshold signal to perform an operation.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1:
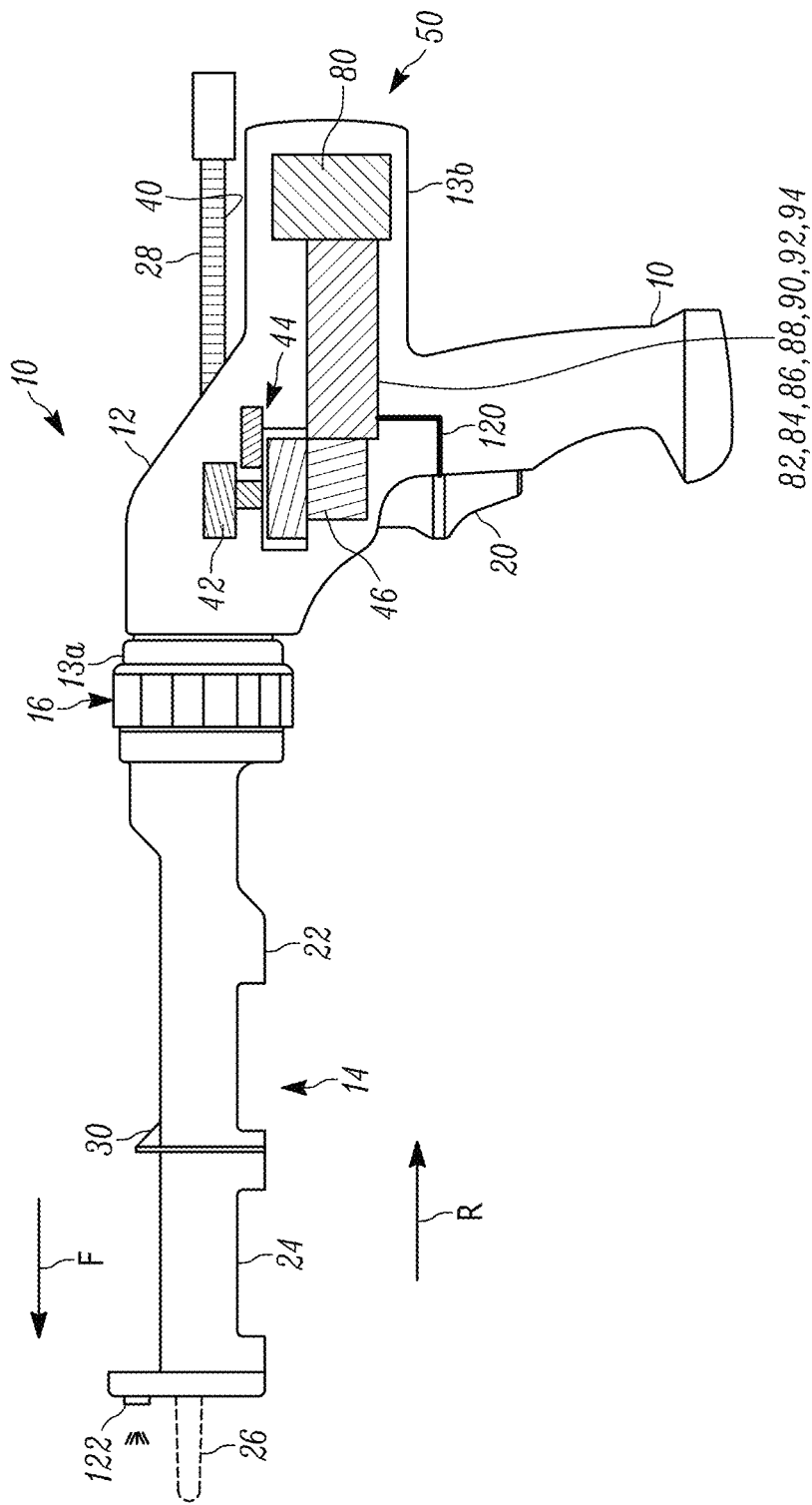
FIG. 1 is a dispensing tool constructed in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to a trigger assembly of a motorized device 10 and method of operation. More specifically, the present disclosure relates to a motor controller that performs a method of operation to respond to a number of cycles of a switch thereby instructing a motor to perform one or more operations.

The motorized device 10 can be any power equipment tool, such as a material dispensing device, an impact wrench, a drill, a saw, any combination thereof and/or the like. Although examples of a material dispensing tool 10 are illustrated and described with regard to FIGS. 1 and 2, it will be understood that the systems and methods of FIGS. 3 and 4 can be used in connection with any type of motorized device, including different types of motorized power equipment or tools that has a trigger or switch. As an example, the trigger or switch can power the power equipment on and/or operate the power equipment in a forward or a reverse direction.

Illustrated in FIG. 1 is a one-part dispensing tool 10 having a body 12 and a cartridge support assembly 14. The cartridge support assembly 14 is attached to the body 12 through its locking assembly 16. The body 12 includes first and second ends 13a, 13b, respectively, a handle portion 18, and a trigger 20 projecting from the handle portion for engagement by an operator of the dispensing tool 10. The cartridge support assembly 14 further includes a cartridge or sausage bag support tube or barrel 22 for supporting a cartridge 24 (shown in phantom) or sausage bag. The support tube or barrel 22 includes a dispensing nozzle 26 (also shown in phantom) for dispensing any number of materials, including, but not limited to, adhesives, lubricants, and sealants. The cartridge or sausage support tube or barrel 22 in the illustrated embodiment of FIG. 1 is molded from a polymeric material, but could also be made from metal and from any other process without departing from the spirit and scope of the claimed disclosure.

An elongated rod 28 extends from the body 12 and is axially advanced through the body into the cartridge or sausage support assembly 14 and cartridge or sausage bag 24 upon activation of the trigger 20. A piston 30 is connected to a forward end of the rod 28, such that axial movement of the rod will cause comparable axial movement of the piston, resulting in the dispensing of material from dispensing nozzle 26 of the cartridge or bag 24 upon advancement.

Motion enabling mechanisms 50 of the rod 28 and piston 30, such as an electric motor 46, controls and gearing 44 are located within the body 12 for advancement and retraction the rod and piston. In the illustrated embodiment the rod 28 includes a rack or tooth 40 portion for engagement by a pinion 42 of a gear assembly 44. Upon engagement of the trigger 20 an internal motor 46 would provide movement in the gear assembly 44, engaging the rod 28 for either advancement or retraction of the rod through the body 12. The motion enabling mechanisms 50 (such as the motor 46, rod 28, gear assembly 44, etc.) for advancing and retracting the rod 28 and piston 30 through the body 12 could alternatively be achieved by other constructions known by those skilled in the art, such as a screw-gear assembly without departing from the spirit and scope of the claimed disclosure.

In one example embodiment, the motor 46 is control by motor controller 82, such as a microprocessor, which both the motor and microprocessor are powered by a power supply 80. The power supply 80 in one example embodiment is a rechargeable battery pack. In an alternate example embodiment, the power supply 80 is hard wired, for example to 120 VAC outlet.

Figure 2:
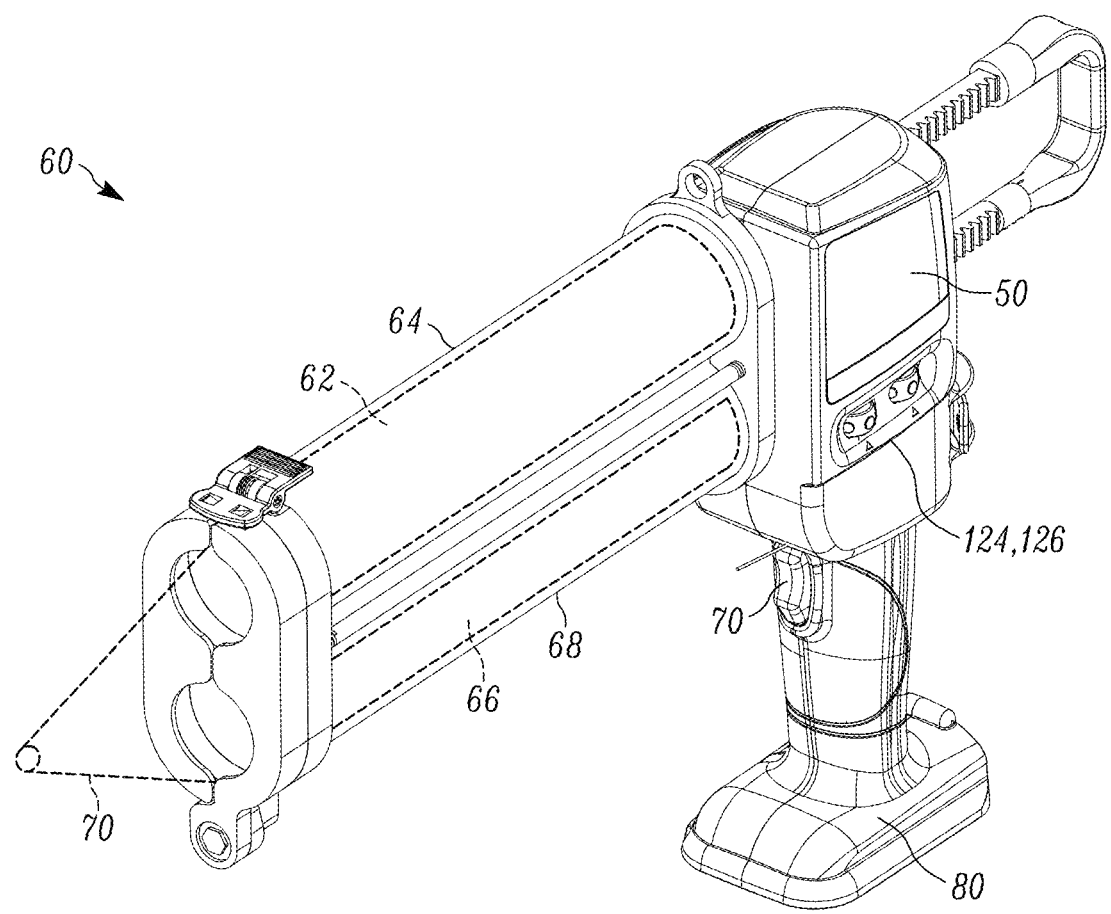
FIG. 2 is a dispensing tool constructed in accordance with another example embodiment of the present disclosure.

Illustrated in FIG. 2 is a two-part dispensing tool 60 that simultaneously dispenses and mixes, for example a bonding agent from a first cartridge 62 located in a first support tube 64 and a hardening agent from a second cartridge 66 disposed in a second support tube 68 together sufficiently at a shared nozzle 72 with the activation of the trigger 70. The two-part dispensing tool 60 also includes similar motion enabling mechanisms 50 receiving power from a power supply 80. Both the one-part and two-part dispensing tools 10, 60, respectively are contemplated to be used with the present disclosure. However, the present disclosure relates to different motorized devices 10 that include a trigger assembly 20 that activates a motor controller 82 (e.g., a microcontroller) that performs a method of operation to respond to a number of taps or cycles of the trigger by forcing the motor 46 to perform one or more operations. Examples of other power equipment tools 10 covered by this disclosure include, but are not limited to, an impact wrench, a drill, a saw, and/or the like.

With material dispensing tool 10, 60, for example, a useful operation 100 that permits for a cleaner and more professional dispensing of material is motor 46 reversal (changing of the direction of the piston 30) upon release of the trigger 20. This operation 100 of motor reversal allows the material to be decompressed, unloading the force required to dispense, and stops the flow of the material. The downside to the motor reversal, however, is as the motor is reversed and the piston is backed off of the material being dispensed. In this state, there is material sitting static inside the material dispensing tool. In some instances, the material may require significant compression to get the material to flow again. Upon pulling the trigger or switch to activate the tool in the forward direction once again, the user must wait a period of time before material is fully compressed and begins to dispense out of the material nozzle. This delay encountered by the user can be considered a nuisance. Alternatively, the user may be working at a high rate of speed with the material dispensing tool 10, 60 in which a motor reversal (or complete stop of flow) is not required. In these situations, the microcontroller 82 (shown in the circuit diagram of FIG. 4 as MEGA16-M) of the material dispensing tool 10, 60 can implement the operation or routine 100 shown in FIG. 3, which allows the user to select when the reversal of the motor 46 occurs. Rather than allowing the tool 10, 60 to reverse every time the trigger or switch 20 is released, changed, (or tapped), the routine or operation 100 shown in FIG. 3 permits motor reversal only when the user rapidly taps the power trigger.

Figure 3:
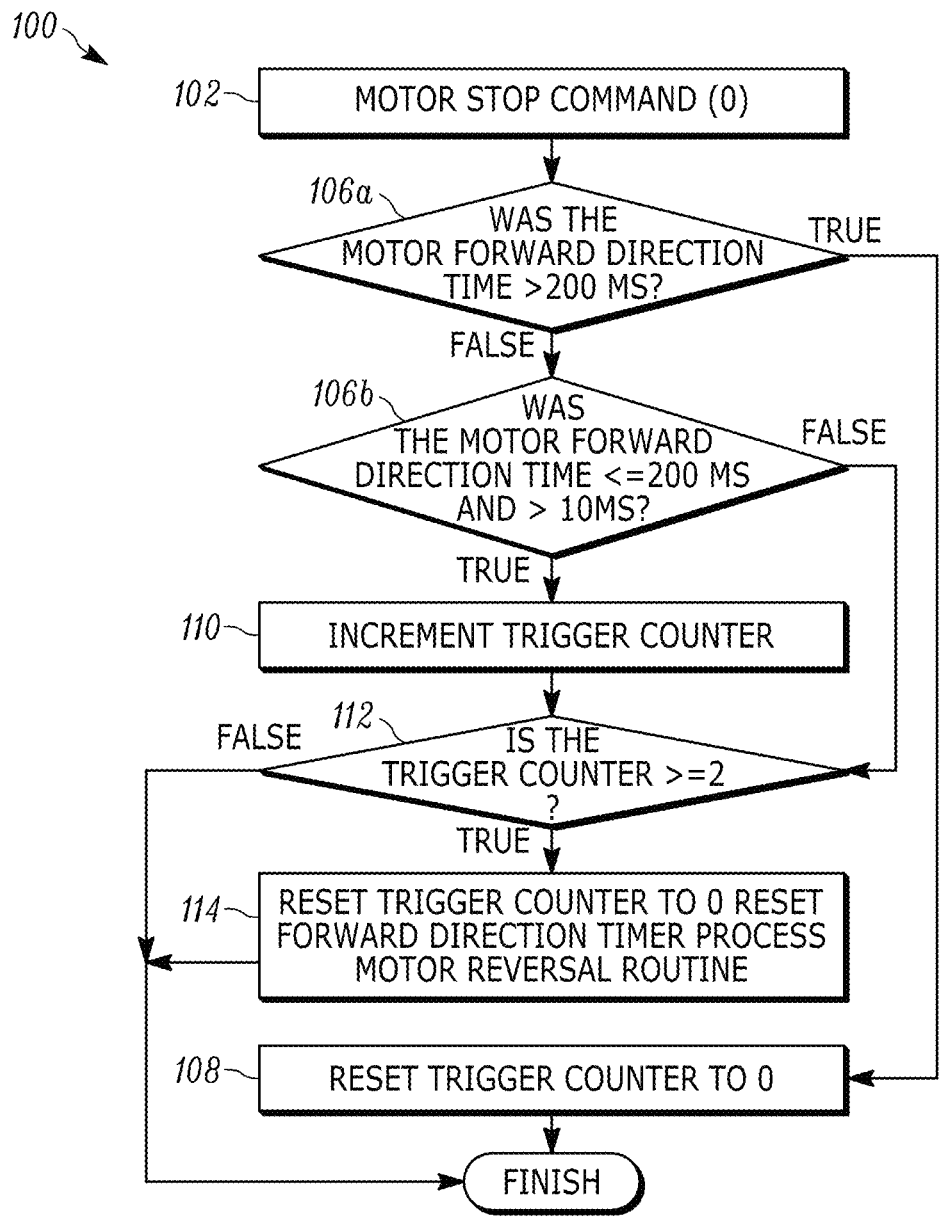
FIG. 3 is a flow chart illustrating an operation of a function that is called by a controller to respond to a number of cycles from a switch, thus forcing a motor of a dispensing tool to perform one or more operations in accordance with one example embodiment of the present disclosure.
Figure 4:
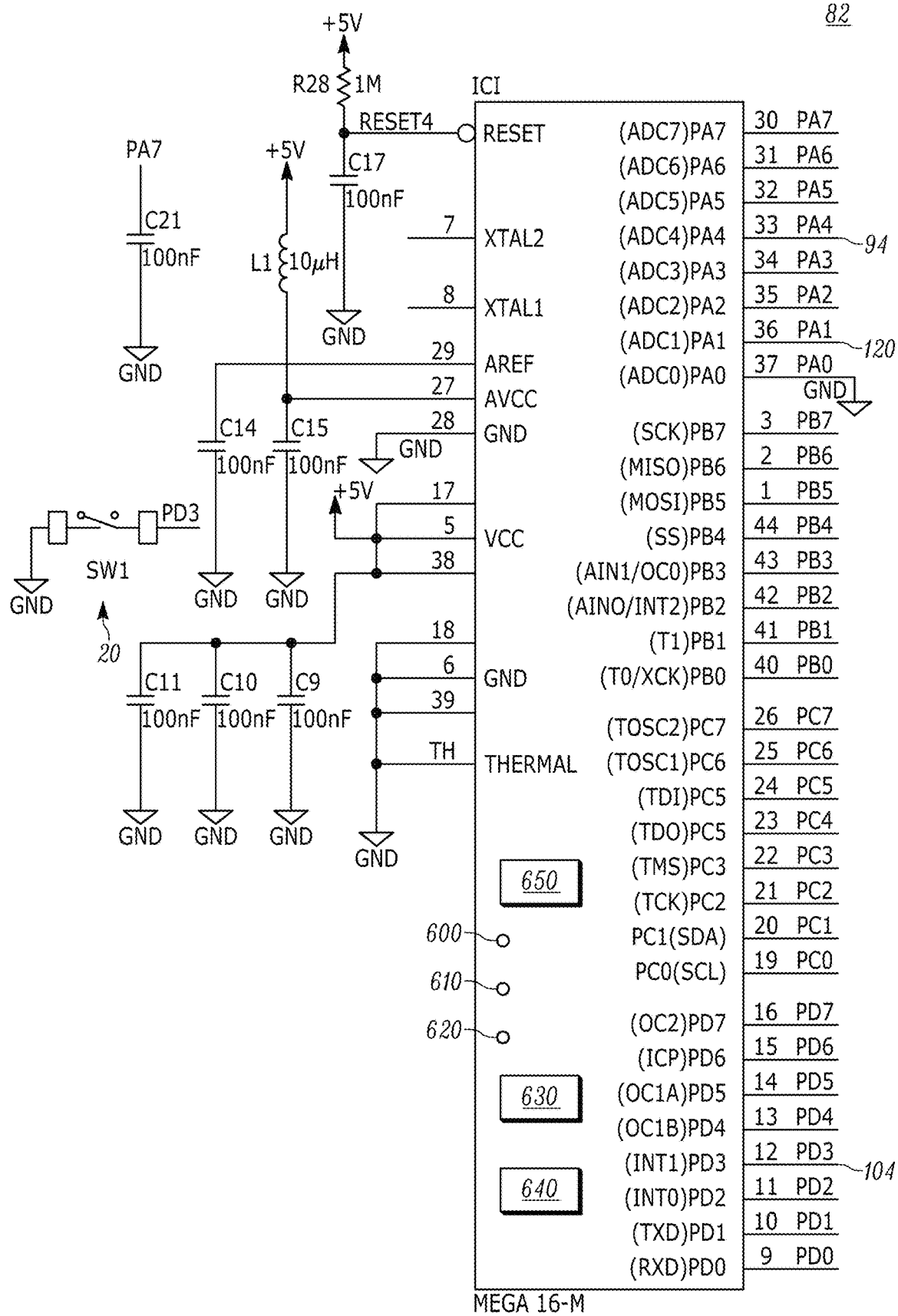
FIG. 4 is a circuit diagram illustrating the control mechanisms of the function that is called by a controller to respond to a number of cycles from a switch, the forcing the motor to perform one or more operations.

A switch or trigger 20 (labeled as SW1 or 2d in FIG. 4) can be used to turn the power equipment or tool 10, 60 on and in the forward direction by drawing low PORT D Pin 3 (Interrupt 1) 104 of the MEGA16-M microcontroller 82, as shown in FIG. 4. For example, a user can activate a trigger 20 on the power equipment tool 10, 60 by pressing a trigger switch 20 to advance the trigger switch to a closed position 20 (shown in an open position in FIG. 4). The MEGA16-M microcontroller 82 can implement the routine or operation 100 shown in FIG. 3 to provide for motor 46 reversal only when the user repeatedly taps or cycles SW1 20 (determined according to a timing threshold 106). The microcontroller 82 contains non-volatile memory type 84, which can be modified with programmed instructions 88 or software 86 by the microcontroller during execution. The microcontroller 82 can write instructions 86 valuable information into memory 84, 90, and this information can later be read using the same connections 92 as are used to install program memory 92 in the microcontroller. Such connections 92 include, but are not limited to, USB, blue tooth, RS 232, wireless, and the like.

The routine or operation 100 of FIG. 3 sets forth conditions for when the motor 46 is reversed. If the microcontroller 82 sees only one trigger 20 pull within a threshold time period 106, the tool 10, 60 is allowed to remain operating in the forward direction (see arrow "F" in FIG. 1). For example, the threshold time period 106 can be predefined based on an average time for a plurality of skilled operators to allow the power equipment 10, 60 to reverse (see arrow "R" in FIG. 1).

In one example embodiment, this threshold time period 106 can be 200 ms or more. However, if the microcontroller 82 sees two trigger pulls or more in a time less than the predefined threshold 106, the microcontroller reverses the motor 46. In some instances, the microcontroller 82 can prevent false triggering (e.g. due to noise or contact bounce) by implementing an accident threshold that is less than the predefined threshold 106. For example, the accident threshold can correspond to a time corresponding to false triggering due to noise or contact bounce. In other words, the accident threshold can be theoretically faster than a user would be able to push the trigger a second time. For example, the second trigger is 10 ms. Accordingly, if the second trigger occurs in a time period 106 that is greater than the accident threshold, but less than the predefined threshold, the motor 46 can be reversed.

As a practical implementation, the routine of FIG. 3 allows a user to push the power trigger 20 on, dispense for a time (e.g., 25 seconds), and then release the trigger to stop forward operation of the motor to and piston 30, but not reverse. Then, if the user decides that they want the tool 10, 60 to reverse to avoid material run on, the trigger switch 20 can be tapped two times or more within a prescribed time period 106a (e.g., in less than 200 ms, as shown in FIG. 3). If multiple taps of the trigger 20 are registered by the microcontroller 82, the motor 46 can be commanded to reverse. However, if the trigger taps occur at a greater time span (e.g., more than 200 ms apart, as shown in FIG. 3), it can be assumed that the user is looking for forward operation, not a reversal. The threshold (e.g., 200 ms) 106a is set to be small enough to avoid false reversals, but long enough that a normal operator would be able to allow the tool to reverse. To prevent false triggering, an accident threshold can be set (e.g., 10 ms) 106b so that there is a minimum amount of time between presses of the trigger to ensure that the different trigger presses are intended by the user.

In yet another example embodiment, the multiple of the trigger results in an input 120 being communicated to an electronic controller 82 within the tool 10, 60, resulting in an output 94 to perform any number of operations. Such operation 94 can include but are not limited to, turning an LED 122 to provide a light source, operate a menu or display board 124 for the operation of the tool 10, 60, such as an LCD, reversal of the motor 46, initiate a timer 126 to operate the motor for a certain amount of time, effect the motor speed, and/or control the torque output of the motor.

Figure 5:
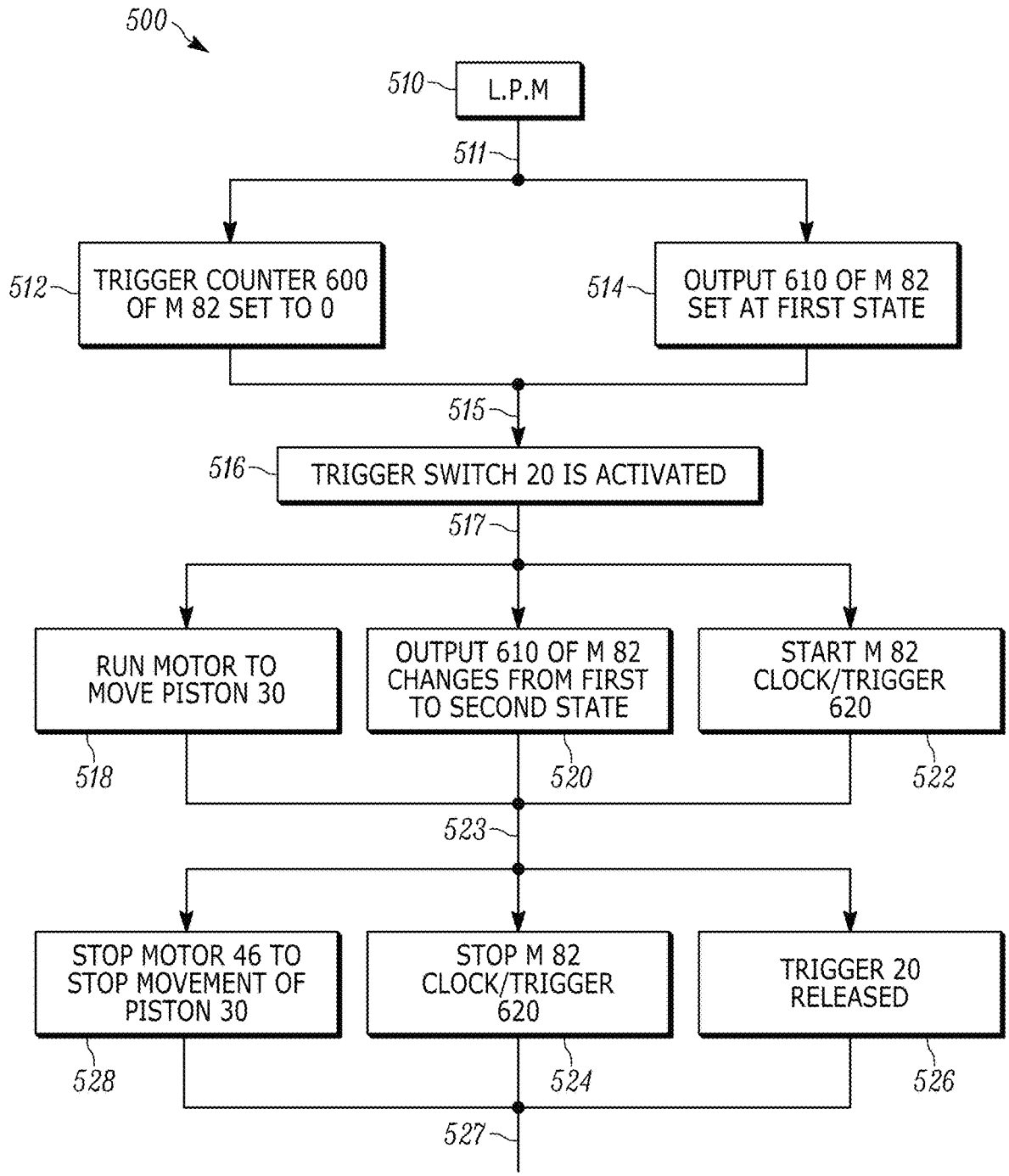
FIG. 5 is a flow chart illustrating an operation of a function that is called by a controller to respond to a number of cycles from a switch, thus forcing a motor of a power tool to perform one or more operations in accordance with another example embodiment of the present disclosure.
Figure 5:
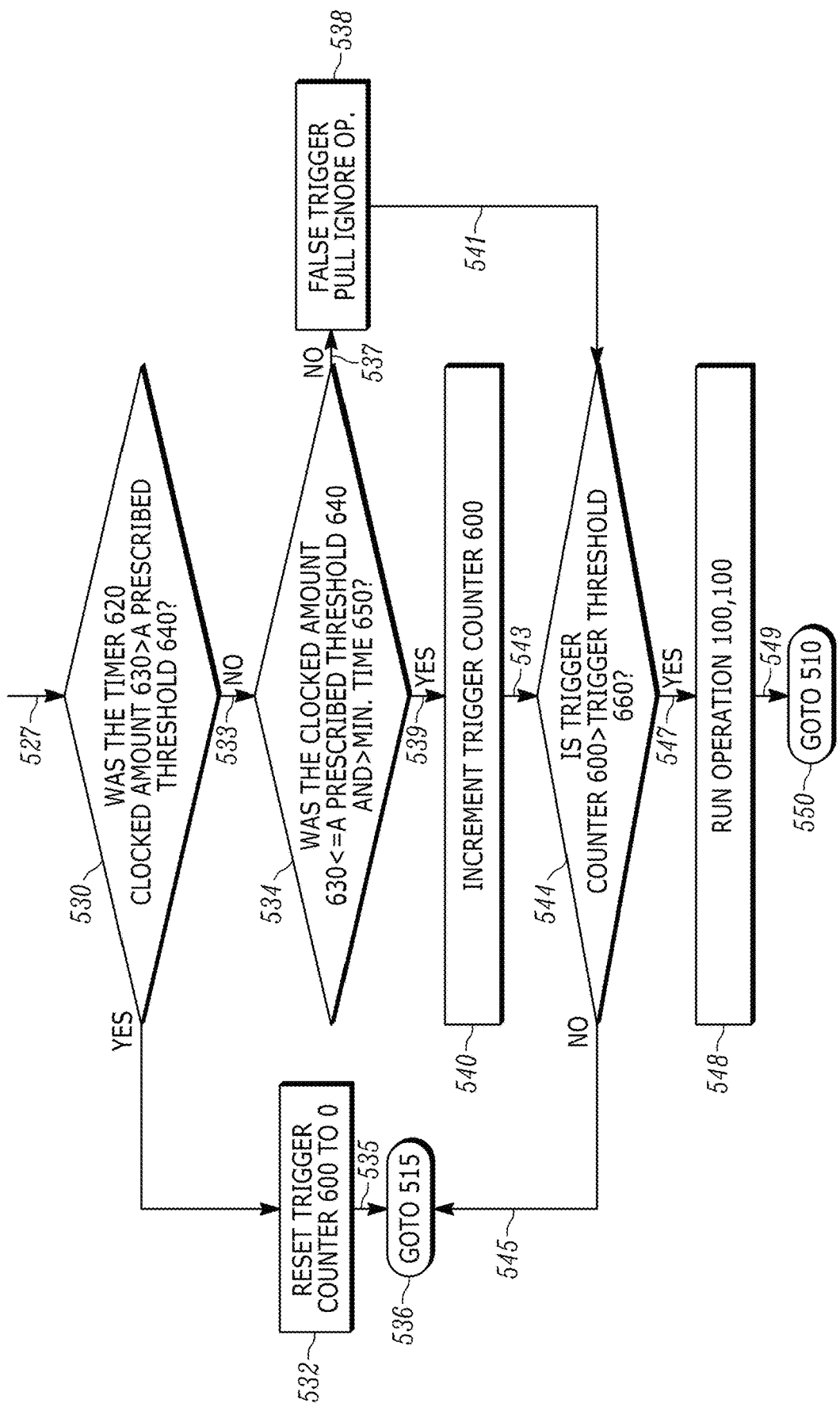

Referring now to FIG. 5 a flow chart illustrating an operation of a function 500 that is called by a controller 82 to respond to a number of cycles from a switch 20, thus forcing a motor 46 of a power tool 10, 60 to perform one or more operations 100 in accordance with another example embodiment of the present disclosure. The operations 100 and functions 500 are a set of instructions that are programmed and stored in the memory 84, 90 of the processor/ microcontroller 82. The instructions performing the operations 100, 500 are software and/or firmware that can be modified and transferred to and from the memory 84, 90. The software functions 500 and/or operations 100 control the one or more processors 82 to implement, in conjunction with certain non-processor circuits, some, most, or all of the functions of the method and/or apparatus described herein. Alternatively, some or all functions 100/500 could be implemented by a state machine that has no stored program instructions, or in one or more application specific integrated circuits (ASICs), in which each function or some combinations of certain of the functions are implemented as custom logic. Of course, a combination of the two approaches could be used.

The function or process 500 to perform and operation 100 and/or 100', which includes, but is not limited to, turning an LED 122 on or off to provide a light source, operate a menu or display board 124 for the operation of the tool 10, 60, such as an LCD, reversal of the motor 46, initiate a timer 126 to operate the motor for a certain amount of time, effect the motor speed, and/or control the torque output of the motor. The process 500 is now described in concert with the flow diagram of FIG. 5 in accordance with one example embodiment of the present disclosure.

The process 500 at 510, the power device 10, 60 is in a low power mode state. That is, energy consumption from power source 80 is minimized while the device 10, 60 is not in use. In the low power or sleep mode state 510, the microcontroller 82 conserves power usage from the power supply 80. At 511, two events simultaneously occur within the controller 82. A trigger counter 600 of the microcontroller 82 is reset to zero at 512 and an output 610 of the microcontroller is set at a first state. A first state of the output 610, is for example, interrupt PD3 610 is reset state taken high or 5 VDC.

The process 500 at 515, encounters an activation of a switch 20, by for example a user engaging the trigger of a power device 10, 60. In FIG. 4, the switch 20 SW1 takes interrupt PD3 from high to low, 0 VDC by closing SW1 to ground, preceding the process 500 to 517. At 517, three different actions occur simultaneously. At 518, the motor 46 is enabled to move the piston 30. At 520, the output 610 of the microcontroller/processor 82 changes from the first state to a second state. And, at 522, the microcontroller 82 starts a clock or timer 620.

The process 500 then proceeds to 523 where three different actions occur simultaneously. At 524, the microprocessor 82 stops the clock 620. At 520 the trigger 20 is released. And at 528, the motor 46 is disabled to stop movement of the piston 30.

The process then proceeds to 527 where a decision operation 530 occurs, which evaluates whether or not the timer 620 clocked an amount 630 that was greater than a prescribed i.e. programmed threshold time 640. If the decision 530 was an affirmative, the process 500 proceeds along 531 to 532 where the trigger counter 600 is reset or nullified to zero and the process returns at 536 to 515. That is, the power tool 10, 60 was considered to have run a normal cycle. If the decision 530 was a negative, the process 500 proceeds to 533 to a second decision operation 534 occurs, which evaluates whether or not the timer 620 clocked an amount 630 was less than or equal to the prescribed amount 630, but greater than a minimum prescribed time 650. If the decision 534 was a negative, the process recognizes it was a false trigger at 538 and the process 500 continues to a third decision 544. If the decision 534 was an affirmative, the process 500 increments the trigger counter 600 at 540 and proceeds to third decision at 544.

The third decision 544 determines if the trigger counter 600 was greater than a trigger prescribed threshold 660. If the determination at 544 was an affirmative, the operation 100 is performed or one of the many operations 100' is performed, such as turning an LED 122 to provide a light source, operate a menu or display board 124 for the operation of the tool 10, 60, such as an LCD, reversal of the motor 46, initiate a timer 126 to operate the motor for a certain amount of time, effect the motor speed, and/or control the torque output of the motor. Once the operation 100 or 100' is complete, the process 500 returns to step 510. If alternatively, the decision at 544 is a negative, the process 500 returns to step 515.

It should be appreciated that the process 500 can cycle through for any number of trigger 20 actuations, such that each cycle that occurs within the thresholds of the process allows for a different operation 100, 100' to be executed by the microprocessor 82. Stated another way, multiple taps or actuations of the trigger 20 within the prescribed time frames, two, three, four, etc., makes the tool 10, 60 perform various operations 100, 100'. In such conditions, the counter threshold 112, 544 would be increased as well for each desired operation 100, 100'.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected or in contact, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   running a power tool to perform a forward operation;
   detecting a first tap of a trigger of the power tool;
   starting a timer upon detecting the first tap of the trigger;
   detecting a second tap of the trigger within a time period determined based on the timer;
   forcing the power tool to perform a reverse operation based on the second tap of the trigger within the time period; and
   operating the power tool in the forward direction when the second tap of the trigger occurs at a time longer than the threshold.

2. The method of claim 1, wherein the power tool is a material dispensing device, an impact wrench, a drill, saw, screwdriver, tubing cutter, or other power tool.

3. The method of claim 1, wherein the method is implemented by an electronic driven motor controller comprising a microprocessor.

4. The method of claim 1, wherein the time period is less than a predefined threshold.

5. The method of claim 4, wherein the threshold is predefined based on an average time for a plurality of skilled operators to allow the power equipment to reverse.

6. The method of claim 5, wherein the threshold is predefined to long enough that a normal operator would be able to allow the power tool to reverse.

7. The method of claim 4, wherein the time period is less than an accident threshold and the power equipment does not reverse.

8. The method of claim 7, wherein the accident threshold corresponds to a time corresponding to false triggering due to at least one of noise and contact bounce.

9. The method of claim 7, wherein the accident threshold corresponds to a time that is less than the predefined threshold.

10. A material dispensing gun comprising:
    a microprocessor coupled to a motor and a power supply, the microprocessor providing a switch for supplying power to the motor from the power supply when the switch is in a first state;
    the microprocessor further comprising a counter, a timer, and memory, the memory having prescribed normal run time threshold, prescribed minimum time threshold, and prescribed counter threshold; and
    said timer being enabled to clock a run time measuring the duration as said switch changes from a second state to said first state, such that when said run time is greater than the minimum prescribed time threshold and less than the prescribed normal run time threshold, said counter is incremented by said microprocessor until said counter is equal to said prescribed counter threshold thereby enabling said microprocessor to provide a threshold signal to perform an operation.

11. The material dispensing gun of claim 10 wherein said operation comprises at least one of:
    a) turning on and off an LED that is coupled to said microprocessor;
    b) operate a menu or display board located on said dispensing gun;
    c) reversal of the motor;
    d) initiate a second timer to operate the motor for a prescribed period of time;
    e) effect the motor speed; and
    f) control the torque output of the motor.

12. A method of operating a dispensing tool, the method comprising the steps of:
    providing a housing for supporting a microprocessor coupled to a motor, power supply, piston, and gear train, the microprocessor providing a switch for supplying power to the motor when the switch is in a first state;
    the microprocessor further providing a counter, a timer, and memory;
    prescribing in said memory a normal run time threshold, a minimum time threshold, and a counter threshold;
    enabling said timer to clock a run time measuring the duration as said switch changes from a second state to said first state;

evaluating said run time with said processor by comparing said run time to said prescribed normal run time threshold and prescribed minimum time threshold; and incrementing said counter by said microprocessor when said comparing said run time is found between said prescribed normal run time threshold and prescribed minimum time threshold until said counter is equal to said prescribed counter threshold thereby enabling said microprocessor to provide a threshold signal to perform an operation.

13. The method of claim 12 wherein said step of performing an operation comprises turning on and off an LED that is coupled to said microprocessor.

14. The method of claim 12 wherein said step of performing an operation comprises operating a menu or display board located on said dispensing gun.

15. The method of claim 12 wherein said step of performing an operation comprises reversing the motor direction.

16. The method of claim 12 wherein said step of performing an operation comprises initiating a second timer to operate the motor for a prescribed period of time.

17. The method of claim 12 wherein said step of performing an operation comprises altering the motor speed.

18. The method of claim 12 wherein said step of performing an operation comprises controlling the torque output of the motor.

19. The method of claim 12 further comprising actuating said switch three times between said thresholds, thereby enabling said microprocessor to provide a second threshold signal to perform a second operation.

20. The method of claim 12 further comprising actuating said switch n times between said thresholds, thereby enabling said microprocessor to provide an n(th) threshold signal to perform an n(th) operation.

* * * * *